United States Patent
Auer et al.

(10) Patent No.: US 9,664,228 B2
(45) Date of Patent: May 30, 2017

(54) CONNECTION BETWEEN TWO PARTS AND METHOD FOR CONNECTING TWO PARTS

(71) Applicant: MAGNA STEYR Fahrzeugtechnik AG & Co KG, Graz (AT)

(72) Inventors: Thomas Auer, Metnitz (AT); Wolfgang Dietz, Pirching (AT); Christoph Krammer, Deutschlandsberg (AT); Andrea Pretzler, St. Katharein (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 503 days.

(21) Appl. No.: 14/362,805

(22) PCT Filed: Dec. 3, 2012

(86) PCT No.: PCT/EP2012/074260
§ 371 (c)(1),
(2) Date: Jun. 4, 2014

(87) PCT Pub. No.: WO2013/083526
PCT Pub. Date: Jun. 13, 2013

(65) Prior Publication Data
US 2014/0363220 A1    Dec. 11, 2014

(30) Foreign Application Priority Data

Dec. 5, 2011 (EP) .................. 11191964

(51) Int. Cl.
*F16C 3/02* (2006.01)
*B29C 65/70* (2006.01)
(Continued)

(52) U.S. Cl.
CPC .............. *F16C 3/026* (2013.01); *B29C 65/70* (2013.01); *B29C 70/30* (2013.01); *B29C 70/845* (2013.01);
(Continued)

(58) Field of Classification Search
CPC .......... F16C 3/02; F16C 3/026; Y10T 403/44; Y10T 403/443; Y10T 403/447;
(Continued)

(56) References Cited

U.S. PATENT DOCUMENTS 3,672,712 A * 6/1972 Davis ..................... B29C 70/84
                                                                174/176
3,938,285 A    2/1976 Gilbu
(Continued)

FOREIGN PATENT DOCUMENTS

DE    3508644 A1    9/1986
EP    0059163 A1    9/1982
FR    1434084 A    4/1966

*Primary Examiner* — Jonathan Masinick
(74) *Attorney, Agent, or Firm* — Jordan IP Law, LLC; Todd A. Vaughn

(57) ABSTRACT

A connection between two components and a method for connecting two components. The two components have plug-together portions with profiles which can be plugged into one another, the plug-together portions of the two components being plugged into one another in an overlapping region, and a winding region of the two components which at least partially coincides with the overlapping region being wound around by a winding of fiber-reinforced plastic.

17 Claims, 5 Drawing Sheets

(51) Int. Cl.
*B29C 70/84* (2006.01)
*B29C 70/30* (2006.01)
*F16L 13/10* (2006.01)
*F16L 13/11* (2006.01)
*B29K 105/00* (2006.01)
*B29K 105/24* (2006.01)
*B29C 65/48* (2006.01)
*B29C 65/50* (2006.01)
*B29C 65/56* (2006.01)
*B29C 65/00* (2006.01)

(52) U.S. Cl.
CPC ............. *F16C 3/023* (2013.01); *F16L 13/10* (2013.01); *F16L 13/11* (2013.01); *B29C 65/483* (2013.01); *B29C 65/4815* (2013.01); *B29C 65/5014* (2013.01); *B29C 65/5042* (2013.01); *B29C 65/5071* (2013.01); *B29C 65/56* (2013.01); *B29C 66/1122* (2013.01); *B29C 66/5221* (2013.01); *B29C 66/721* (2013.01); *B29K 2105/246* (2013.01); *B29K 2105/253* (2013.01); *Y10T 403/475* (2015.01)

(58) Field of Classification Search
CPC ............... Y10T 403/341; Y10T 403/47; Y10T 403/473; Y10T 403/475; F16L 55/168; F16L 55/1683; F16L 55/1686; B29C 66/70; B29C 66/71; B29C 66/7212
See application file for complete search history.

(56) References Cited

U.S. PATENT DOCUMENTS

| 4,407,528 | A | | 10/1983 | Anthony | |
|---|---|---|---|---|---|
| 4,792,320 | A | * | 12/1988 | Nickel | F16C 3/026 464/181 |
| 5,732,743 | A | | 3/1998 | Livesay | |
| 2002/0117228 | A1 | * | 8/2002 | Nakajima | F16C 3/026 138/153 |
| 2003/0125117 | A1 | * | 7/2003 | Burkett | F16C 3/026 464/181 |
| 2005/0239562 | A1 | * | 10/2005 | Lin | B29C 70/462 464/181 |
| 2006/0272724 | A1 | * | 12/2006 | Borland | F16L 55/175 138/99 |
| 2008/0053554 | A1 | * | 3/2008 | Salama | B29C 70/086 138/172 |
| 2008/0064511 | A1 | * | 3/2008 | Brace | F16C 3/026 464/181 |
| 2009/0260703 | A1 | * | 10/2009 | Iwai | B29C 33/52 138/109 |
| 2011/0079311 | A1 | * | 4/2011 | Lazzara | B29C 63/10 138/99 |
| 2013/0140811 | A1 | * | 6/2013 | Fahrer | F16L 13/103 285/285.1 |
| 2014/0093309 | A1 | * | 4/2014 | Fleischer | B29C 70/84 403/270 |
| 2014/0166208 | A1 | * | 6/2014 | Schubiger | B29C 66/721 156/468 |

* cited by examiner

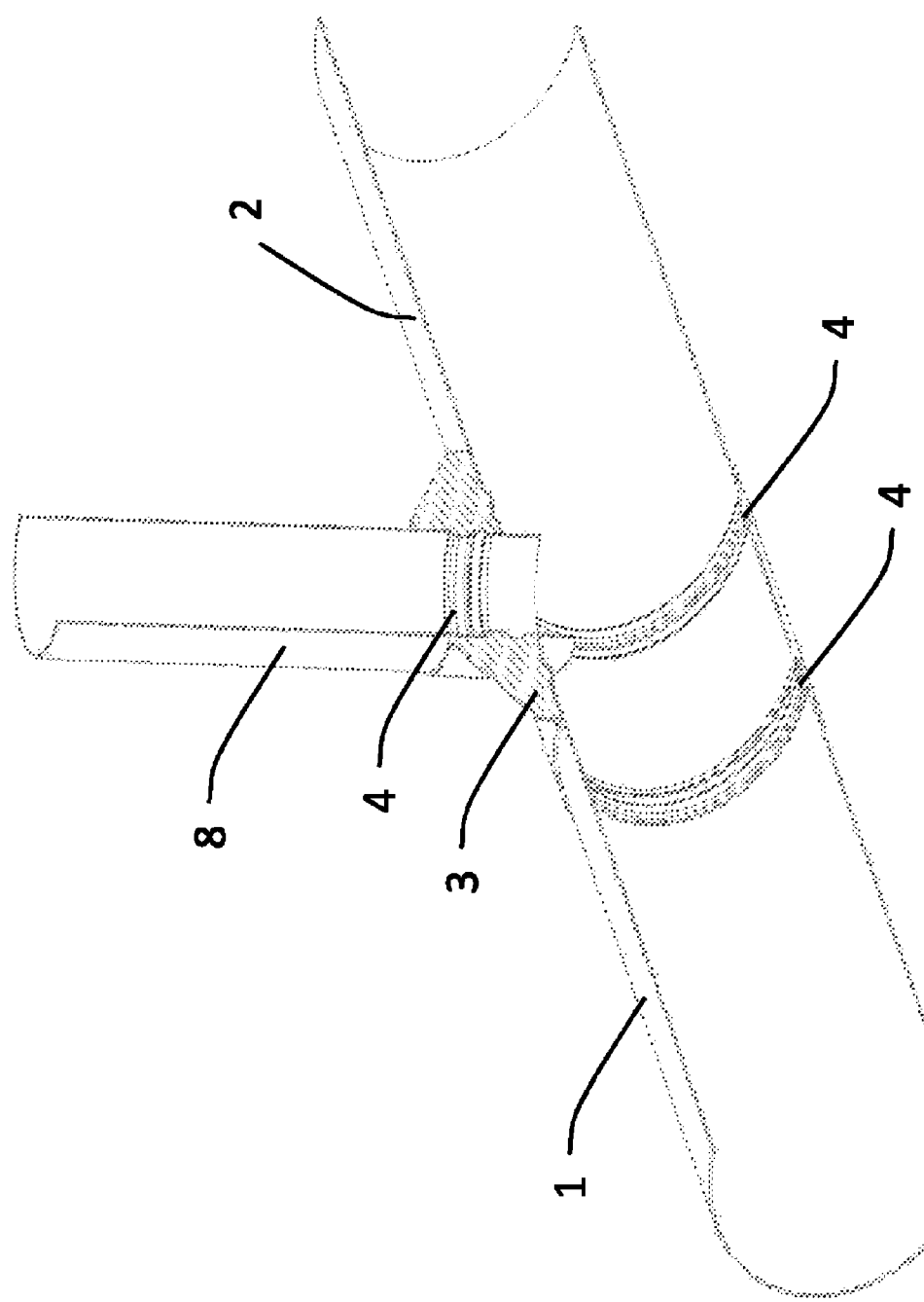

CONNECTION BETWEEN TWO PARTS AND METHOD FOR CONNECTING TWO PARTS

CROSS-REFERENCE TO RELATED APPLICATIONS

The present application is a National Stage Application of PCT International Application No. PCT/EP2012/074260 (filed on Dec. 3, 2012), under 35 U.S.C. §371, which claims priority to European Patent Application No. EP11191964.3 (filed on Dec. 5, 2011), which are each hereby incorporated by reference in their respective entireties.

TECHNICAL FIELD

The present invention relates to a connection between two components, the two components having plug-together portions with profiles which can be plugged into one another and to a method for connecting two components, the two components having plug-together portions with profiles which can be plugged into one another.

BACKGROUND

The mere plugging of such components into one another is often not sufficient to produce a stable connection, and it is therefore known for example additionally to adhesively bond, weld, rivet or screw the connecting regions. In particular if one of the two components comprises fiber-reinforced plastic and the other component is either likewise produced from fiber-reinforced plastic or produced from another material, other connecting methods, such as the use of inserts or flanges as connecting elements, have also been proposed. However, separately prefabricated connecting elements are required as a result. In particular if the two components or components and connecting elements comprises different materials, the connections mentioned are often insufficient, since the components have different thermal expansion characteristics and are differently affected by corrosion.

A method for connecting two rod ends of fiber-reinforced plastic is known for example from German Patent Publication No. DE 3508644 A1. In the case of this method, the ends of the rods to be connected are beveled and are then adhesively bonded to one another in true alignment.

European Patent Publication No. EP 0 059 163 A1 discloses a connection between a hollow shaft of fiber-reinforced plastic and a metal element, the metal element having an inner ring, which on the inside lies against the wall of the hollow shaft, and a further metal ring is used as an outer ring, so that the hollow shaft of fiber-reinforced plastic is clamped in between the two metal rings. The connection is produced by first the outer of the two rings being thermally shrink-fitted onto the shaft and then the shaft together with the outer ring being thermally shrink-fitted onto the inner ring.

The known connections are consequently to some extent less reliable and on the other hand complex and laborious to produce.

SUMMARY

It is an object of the invention to improve in this respect connections between two components of the type mentioned and in particular to provide a connection that is efficient and easy to produce. It is also an object of the invention to provide a method for connecting two components of the type mentioned.

The object is achieved by a connection between two components, the two components having plug-together portions with profiles which can be plugged into one another, the plug-together portions of the two components being plugged into one another in an overlapping region, and a winding region of the two components which at least partially coincides with the overlapping region being wound around by a winding of fiber-reinforced plastic.

The object in accordance with the invention is also achieved by a method for connecting two components, the two components having plug-together portions with profiles which can be plugged into one another, comprising the method steps of: plugging the two plug-together portions of the two components into one another in an overlapping region; winding around a winding region of the two components which at least partially coincides with the overlapping region a winding comprising fiber material; and curing a matrix material of the winding in a mold.

Therefore, in accordance with the invention, the two components are plugged into one another at their plug-together portions. In order that the plug-together portions can be plugged into one another, both components must have similar profiles with similar dimensions, for example similar diameters, which may preferably be configured as closed round, rectangular or square profiles. Furthermore, fiber-reinforced plastic is wound around the two components, the region of the winding at least partially lying in the portion of the components in which the profiles also overlap. Preferably, at least the entire overlapping region is also wound around.

The fiber material of the fiber-reinforced plastic may in this case advantageously comprise inorganic or organic reinforcing fibers, such as for example glass fibers, Kevlar fibers, aramid fibers, carbon fibers, plant fibers, mineral fibers or mixtures of the same, which are for example in the form of fiber strands, woven, braided or knitted fiber structures and/or nonwoven fiber webs.

The matrix material of the fiber-reinforced plastic may be a thermosetting or else thermoplastic matrix, such as for example polypropylene, polyphenylene sulfide, polyetherether ketone, polyester resin or epoxy resin or else an elastomeric matrix such as rubber or polyurethane.

Developments of the invention are provided in the dependent claims, the description and the accompanying drawings.

The winding region of a connection in accordance with the invention preferably extends over the entire overlapping region and preferably reaches beyond the overlapping region on both sides. In this way, a sufficient winding with fiber material is achieved, so that a stable frictionally engaging connection is ensured.

In one embodiment, the two components may comprises different materials.

For example, the connection in accordance with the invention can be used advantageously if at least one of the two components comprises fiber-reinforced plastic. Particularly preferably, both components comprises fiber-reinforced plastic. Since not only one or both components but also the winding comprises fiber-reinforced plastic, problems with different materials, such as different thermal expansions and contact corrosion, are avoided.

In a preferred refinement of the connection, at least one of the two components has at least one formation in the winding region, so that the winding of fiber-reinforced plastic is connected to the formation with interlocking engagement. As a result, a stable interlocking engagement is also achieved in addition to the frictionally engaging force component, with the effect in particular of avoiding axial sliding out along the axis of the plugging of the two components into one another. In this way, the matrix and the fiber of the winding in the formation counteract forces along the component axis.

At the same time, the at least one formation is preferably a constriction, a stepped recess or groove running around in the circumferential direction of the closed profile of the at least one component, that is to say in particular a running-around channel. As a result, an interlocking engagement in the longitudinal direction of the components is achieved.

The formation may preferably be configured such that, in addition or as an alternative to the interlocking engagement in the longitudinal direction, an interlocking engagement against twisting, that is to say transversely in relation to the longitudinal direction of the components, is achieved.

In one embodiment, a connection in accordance with the invention comprises a third component, which has a plug-together portion, the plug-together portions of the three components being plugged into one another in an overlapping region, and a winding region of the three components which at least partially coincides with the overlapping region being wound around by a winding of fiber-reinforced plastic. The connecting, in accordance with the invention, of three components makes it possible for example to build up a stable T connection from three components. In this case, particularly preferably, all three components each have at least one radial channel, which is wound around with interlocking engagement.

In accordance with the invention, a T connection or an X connection may also be built up from just two components. In this case, the first component preferably has at least one lateral opening, and one end of the second component is plugged into the opening in the first component, for example at right angles. The opening in the first component and the end of the second component then form the plug-together portions. The overlapping region is formed by the end of the second component protruding into the first component. The first component may preferably have radially running-around formations to both sides of the opening, the second component may have a further radially running-around formation near its plugged-in end. The winding with fiber-reinforced plastic, and therefore the winding region, will then advantageously cover all three formations with interlocking engagement.

Serving for producing a connection in accordance with the invention is the method mentioned, in accordance with invention, which comprises at least the following steps: plugging the two plug-together portions of the two components into one another in an overlapping region; winding around a winding region of the two components which at least partially coincides with the overlapping region a winding comprising fiber material; and curing a matrix material of the winding in a mold.

In this case, the winding, which comprises fiber material, may at the time of winding around already contain the matrix material, that is to say be formed as a preimpregnated semifinished product (known as a prepreg). As a result, it is not necessary to add matrix material to the winding at a later time.

In one embodiment of the method for connecting two components, the winding is at the time of winding around a dry fiber material without matrix material. In this case, a matrix material is introduced into the fiber material after the winding around of the components.

The matrix material is preferably injected or poured into the fiber material in a mold after the winding around.

DRAWINGS

The invention is described below by way of example with reference to the drawings.

FIG. 8 illustrates a three-dimensional sectional representation of a connection in accordance with the invention between three components to form a T piece.

DESCRIPTION

Figure 1:
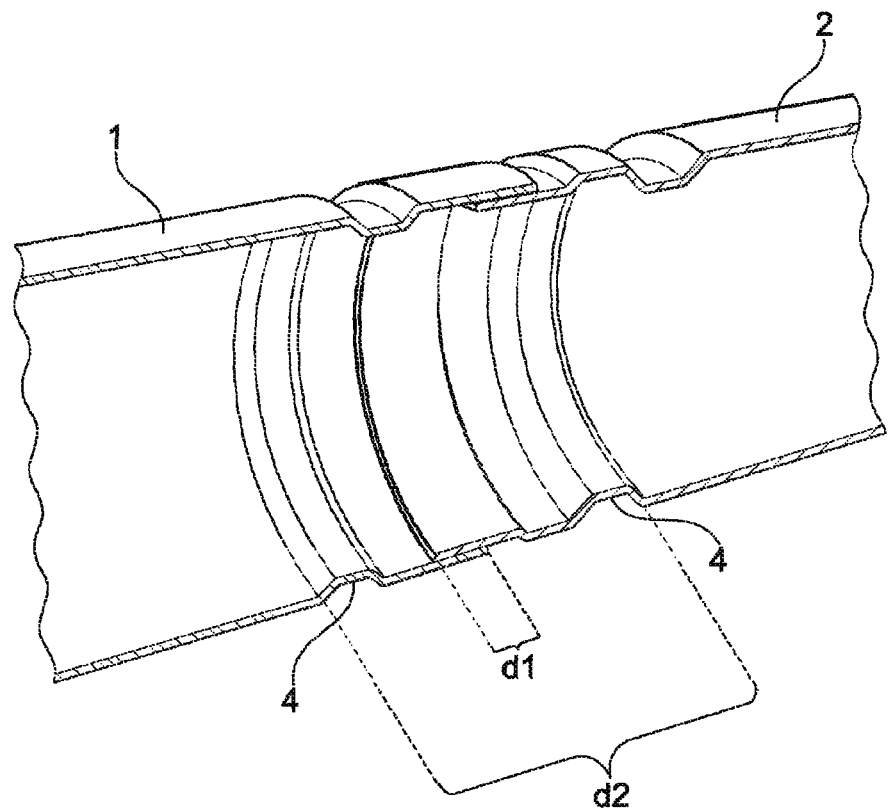
FIG. 1 illustrates a 3D representation of a first step of a method in accordance with the invention.
Figure 2:
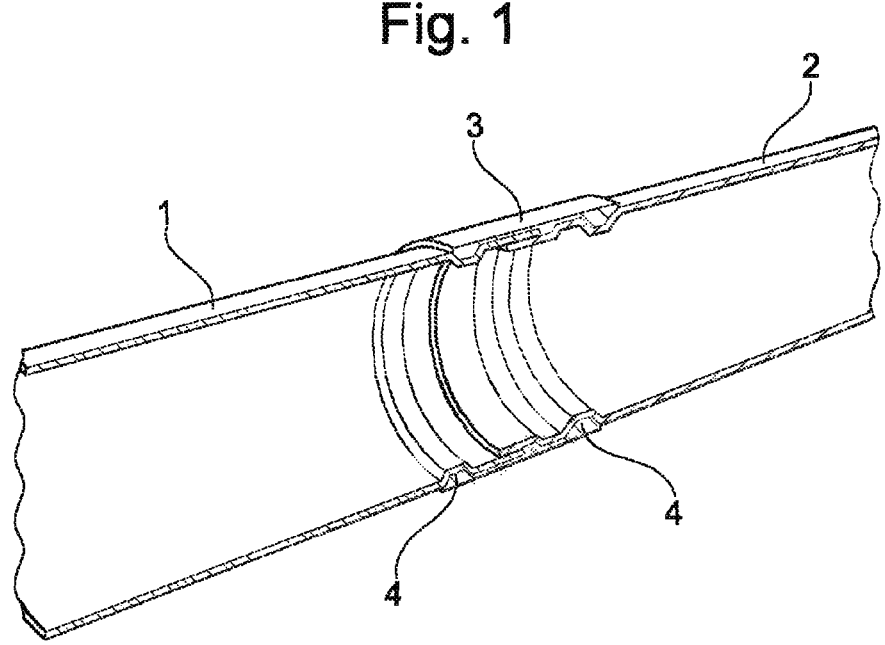
FIG. 2 illustrates a 3D representation of a second step of a method in accordance with the invention.
Figure 3:
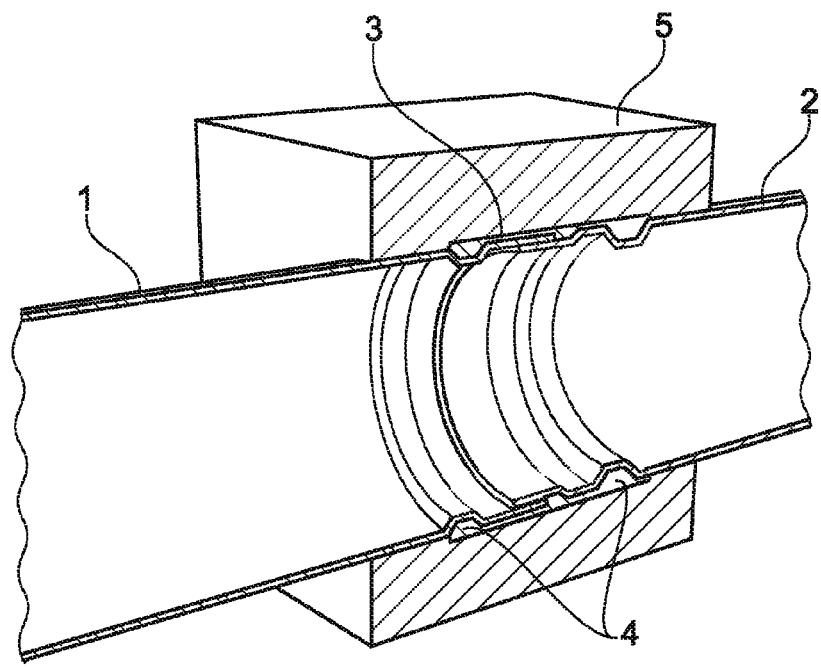
FIG. 3 illustrates a 3D representation of a third step of a method in accordance with the invention.

In FIGS. 1-3, a method in accordance with the invention for connecting two components 1 and 2 is represented, the two components 1 and 2 having plug-together portions which can be plugged into one another. The components may in this case have specially formed plug-together portions or else, as represented in the figures, be formed as a whole in such a way that they can be plugged into one another.

FIG. 1 illustrates the first method step, in which the two plug-together portions of the two components 1 and 2 are plugged into one another in an overlapping region d1. The overlapping region d1 is smaller in the direction of the plugging into one another than the intended winding region d2 and represents a partial region of the winding region d2. Formations 4, which are configured as grooves with sloping walls and run around the profiles of the plug-together portions, are formed on both components 1 and 2. In the case of both components 1 and 2, the grooves lie outside the overlapping region d1, but within the winding region d2.

FIG. 2 illustrates a further method step, in which the winding region of the two components 1 and 2 is wound around by a winding 3 of fiber material. The winding 3 may in this case comprises already preimpregnated or else dry fibers without matrix material. The winding 3 also comes to lie in this case within the formations 4 in the two components 1 and 2.

As illustrated in FIG. 3, after the application of the winding 3, at least the connecting region of the two components 1 and 2 is placed in a mold 5. If required, a polymer matrix may also be injected into the winding 3 in the mold 5. The fiber-reinforced plastic cures in the mold 5 in a known way, for example in a chemical way. The finished composite comprising the component 1, the component 2 and the winding 3 can subsequently be removed from the mold 5.

Figure 4:
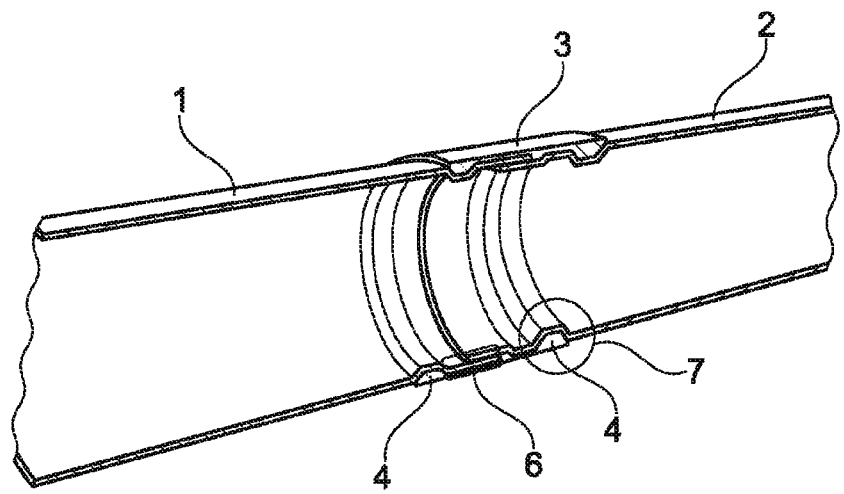
FIG. 4 illustrates is a 3D representation of a connection in accordance with the invention between two components with a circular profile.

FIG. 4 illustrates the components 1 and 2 connected to one another in accordance with to the invention, which in an overlapping region are plugged into one another in the direction of a common longitudinal axis of the components, and in a winding region are covered by an already cured winding 3 of fiber-reinforced plastic. In the overlapping region, this involves the formation of a zone 6 with a frictionally engaging connection between the two components 1 and 2 and the formation of zones 7 with an interlockingly engaging connection between the recesses 4 in the components 1 and 2 and the winding 3.

Figure 5:
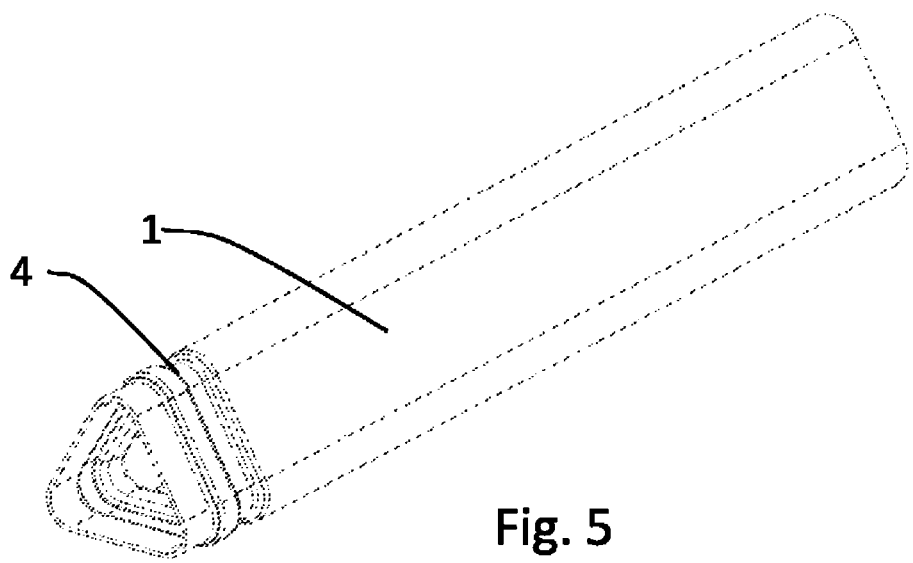
FIG. 5 illustrates a 3D representation of a component with a triangular profile for use in a connection in accordance with the invention.

FIG. 5 illustrates a component 1 with a triangular profile, which is prepared for use in a connection in accordance with the invention. For this purpose, the component 1 has a running-around groove as the formation 4. A further component 1, at least approximately of the same kind, may be plugged into the component 1, and be wound around in the region of the formation 4 by fiber-reinforced plastic.

Figure 6:
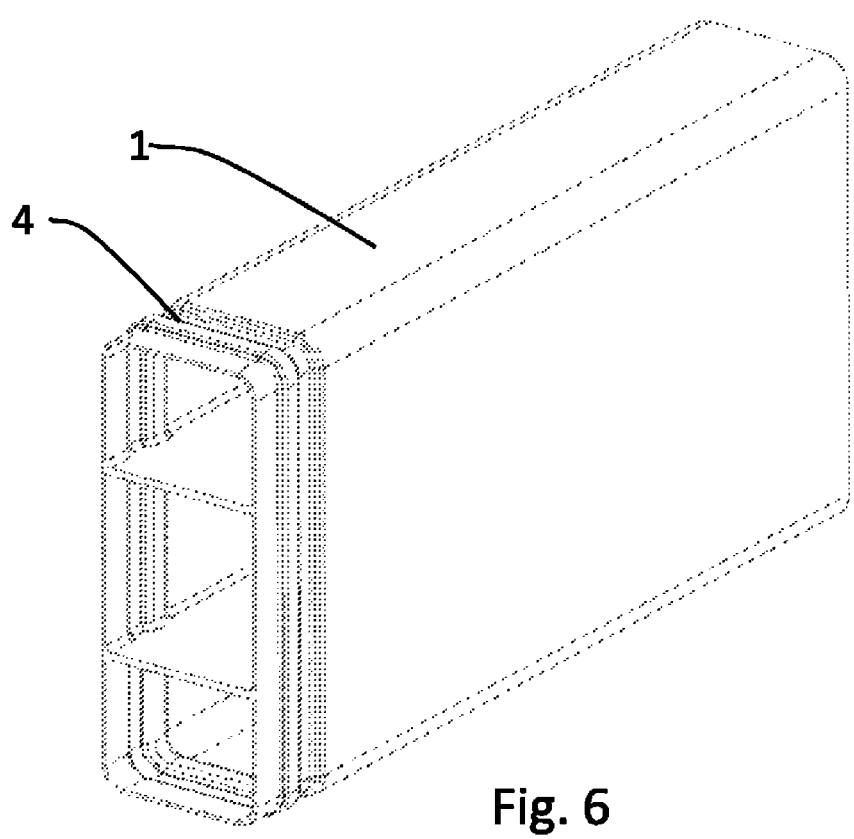
FIG. 6 illustrates a 3D representation of a component with a hollow-chamber profile for use in a connection in accordance with the invention.

In a way similar to FIG. 5, FIG. 6 illustrates a component 1 with a hollow-chamber profile, which likewise has running around the outside a formation 4, for use in a connection in accordance with the invention.

Figure 7:
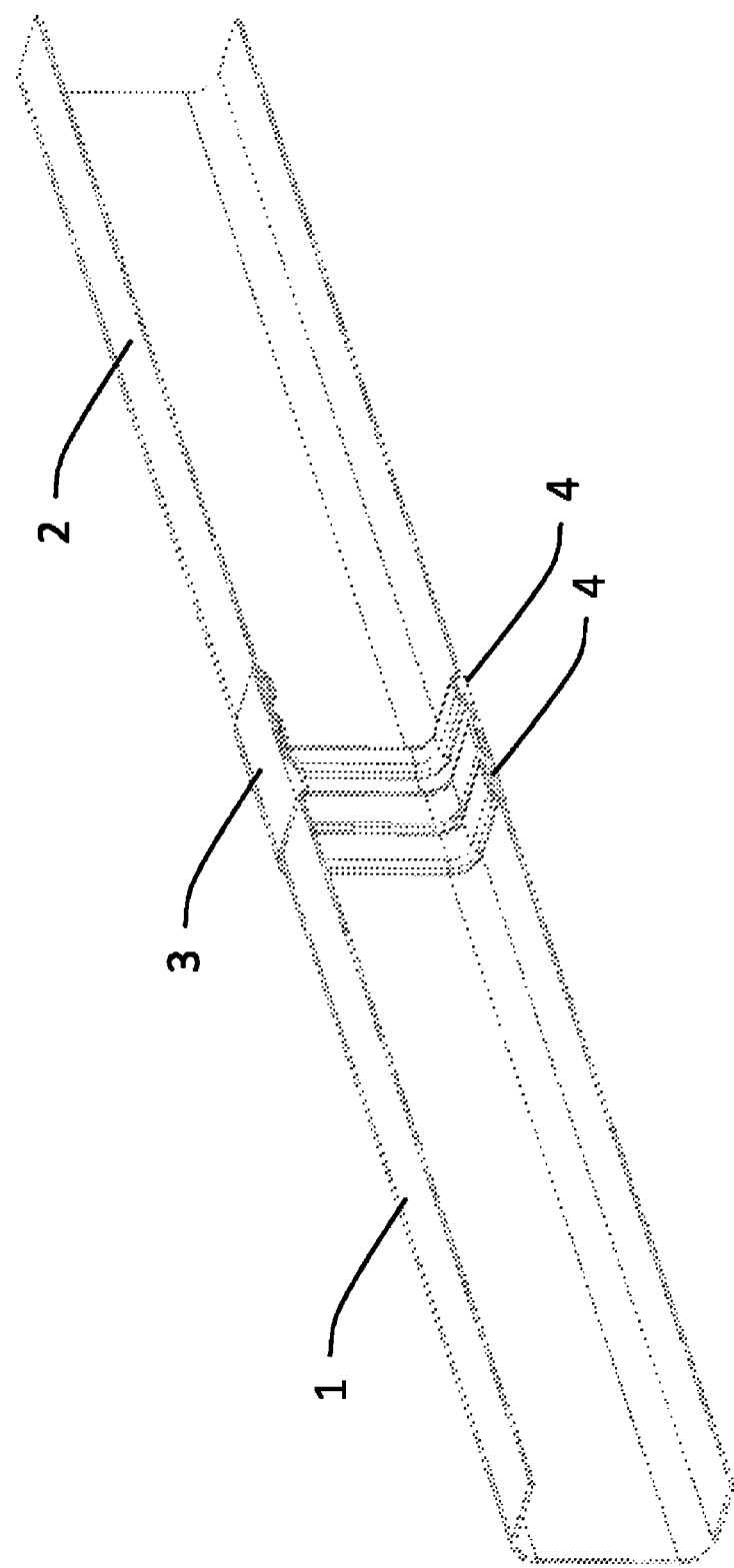
FIG. 7 illustrates a three-dimensional sectional representation of a connection in accordance with the invention between two components with a square profile.

FIG. 7 is a three-dimensional sectional representation of a connection in accordance with the invention between two components 1 and 2 with a closed square profile.

An open shape, corresponding to FIG. 7, for example a U shape, of connected components 1 may however also be produced as the result of a connecting method in accordance with the invention, in particular if, after the winding around and preferably after the curing, closed components 1 that are connected to one another are separated into two approximately U-shaped halves along the longitudinal axis.

FIG. 8 is a three-dimensional sectional representation of a connection in accordance with the invention between three components 1, 2 and 8, which together form a T piece. Here, each of the components 1, 2, 8 may have a formation 4, in particular a channel. Alternatively, FIG. 8 may be seen as a T connection of merely two components, one of the two components, which is formed by 1 and 2, then taking the form of a continuous profile with two formations 4 to the left and right of a lateral opening, and the other component, formed by 8, being plugged into the opening in the continuous profile 1, 2. The entire region of the connection that comprises the three formations 4 is wound around by fiber-reinforced plastic.

The invention consequently makes an easy and reliable connection between two components possible.

LIST OF REFERENCE SIGNS

1 first component
2 second component
3 winding
4 formation
5 mold
6 zone with frictionally engaging connection
7 zone with interlockingly engaging connection
8 third component
d1 overlapping region
d2 winding region

What is claimed is:

1. A connection, comprising:
a first component having a first plug-in portion;
a second component having a second plug-in portion for receipt by the first plug-in portion to define an overlapping region; and
a winding of fiber-reinforced plastic provided around the first component and the second component to define a winding region which overlaps the overlapping region,
wherein the first component and the second component respectively have grooves running around in a circumferential direction of the winding region and outside the overlapping region, to permit a connection of the winding to the first component and the second component with an interlocking engagement in a longitudinal direction.

2. The connection of claim 1, wherein the first component comprises a first material.

3. The connection of claim 2, wherein the second component comprises a second material that is different from the first material.

4. The connection of claim 3, wherein one of the first component and the second component comprises fiber-reinforced plastic.

5. The connection of claim 1, wherein the first component and the second component each comprises fiber-reinforced plastic.

6. The connection of claim 1, wherein at least one of the first component and the second component has at least one formation at the winding region.

7. The connection of claim 6, wherein the at least one formation permits connection of the winding to the first component and the second component with interlocking engagement.

8. The connection of claim 7, wherein the at least one formation comprises the grooves.

9. A connection, comprising:
a first component having a first plug-in portion;
a second component having a second plug-in portion for receipt by the first plug-in portion to define a first overlapping region;
a third component having a third plug-in portion for receipt by the first plug-in portion and the second plug-in portion to define a second overlapping region; and
a winding of fiber-reinforced plastic provided around the first component, the second component and the third component to define a winding region which overlaps the first overlapping region and the second overlapping region,
wherein the first component, the second component, and the third component respectively have grooves running around in a circumferential direction of the winding region and outside the first overlapping region and the second overlapping region, to permit a connection of the winding to the first component, the second component, and the third component with an interlocking engagement in a longitudinal direction.

10. The connection of claim 9, wherein at least one of the first component, the second component and the third component has at least one formation at the winding region.

11. The connection of claim 10, wherein the at least one formation permits connection of the winding to the first component, the second component and the third component with interlocking engagement.

12. The connection of claim 11, wherein the at least one formation comprises the grooves.

13. A method for connection components, the method comprising:
providing a first component having a first plug-in portion and a second component having a second plug-in portion;
receiving the second plug-in portion into the first plug-in portion to define an overlapping region;
providing a winding of fiber-reinforced plastic around the first component and the second component to define a winding region which overlaps the overlapping region;
curing a matrix material of the winding in a mold, and wherein the first component and the second component respectively have grooves running around in a circumferential direction of the winding region and outside the overlapping region, to permit a connection of the winding to the first component and the second component with an interlocking engagement in a longitudinal direction.

14. The method of claim 13, wherein before providing the winding, the winding is formed as a pre-impregnated semi-finished product.

15. The method of claim 13, comprising, after providing the winding, introducing the matrix material into a dry fiber material of the winding.

16. The method of claim 13, wherein curing the matrix material comprises winding a dry fiber material without a matrix material, and then injecting the matrix material into the dry fiber material in a mold.

17. The method of claim 13, further comprising after providing the winding, pouring the matrix material into a dry fiber material in a mold.

* * * * *